United States Patent
Joseph

[11] Patent Number: 6,136,060
[45] Date of Patent: Oct. 24, 2000

[54] LOW COST HIGH SPEED TITANIUM AND ITS ALLOY PRODUCTION

[76] Inventor: Adrian A. Joseph, 27451 Maverick Cir., Laguna Hills, Calif. 92653

[21] Appl. No.: 09/173,899

[22] Filed: Oct. 16, 1998

[51] Int. Cl.[7] .............................. C22B 9/02; C22B 34/12; C22C 14/00

[52] U.S. Cl. .............................. 75/10.19; 75/617; 75/621; 420/420; 420/590; 373/81; 423/492; 423/77

[58] Field of Search .................. 75/617, 621, 10.19; 420/590, 420; 373/81; 423/492, 77

[56] References Cited

U.S. PATENT DOCUMENTS

| | | | |
|---|---|---|---|
| 3,647,383 | 3/1972 | Farmer et al. | 23/202 |
| 3,760,071 | 9/1973 | Brzozowski et al. | 423/613 |
| 4,080,194 | 3/1978 | Fey | 75/10.19 |
| 4,731,230 | 3/1988 | Lailach et al. | 423/77 |
| 5,460,642 | 10/1995 | Leland | 75/617 |
| 5,503,655 | 4/1996 | Joseph | 75/10.19 |
| 5,861,070 | 1/1999 | Reichman et al. | 148/671 |

OTHER PUBLICATIONS

Merriam–Webster's Collegiate Dictionary, 1993 pp. 578 & 1027.

*Primary Examiner*—Roy V. King
*Assistant Examiner*—Tima McGuthry-Banks
*Attorney, Agent, or Firm*—Natan Epstein; Beehler & Pavitt

[57] ABSTRACT

A method for refining a titanium metal containing ore such as rutile or illmenite or mixtures to produce titanium ingots or titanium alloys and compounds of titanium involves production of titanium tetrachloride as a molten slag, by processing the ore in a chlorination procedure and removing various impurities by a distillation or other procedure to form a relatively pure titanium tetrachloride ($TiCl_4$). Thereafter, the titanium tetrachloride is introduced into the plasma focal point of a plasma reactor in a molten sodium environment for the initial reduction of gas phase titanium into titanium molten drops which are collected by a set of skulls. Thereafter, further processing are carried out in higher vacuum and the titanium is heated by electron beam guns in order to maximize titanium purity and, in a final optional stage, alloying compounds are added under yet higher vacuum and high temperature conditions.

9 Claims, 4 Drawing Sheets

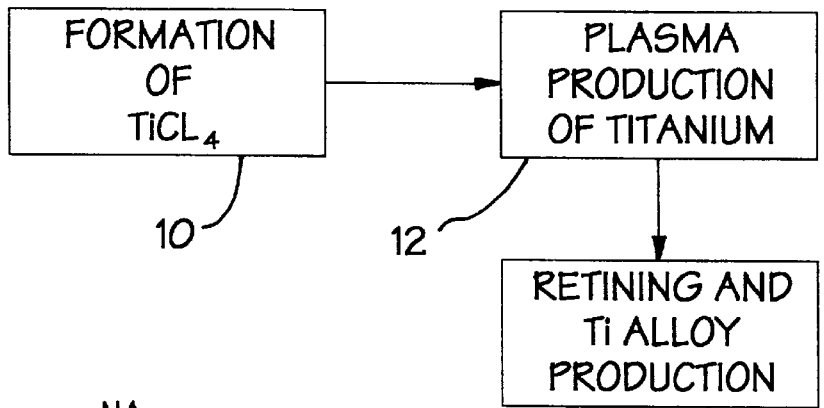
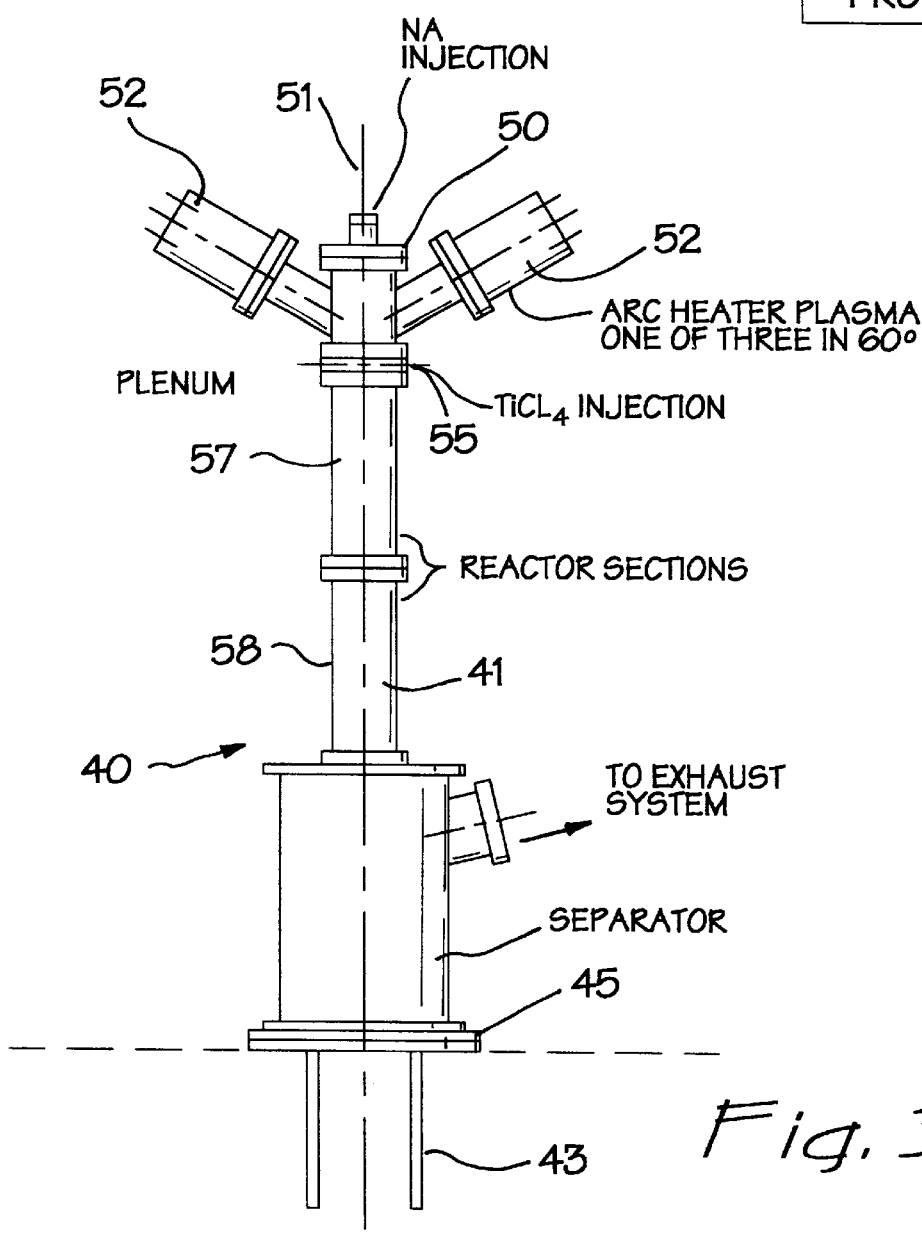

LOW COST HIGH SPEED TITANIUM AND ITS ALLOY PRODUCTION

FIELD OF INVENTION

The present invention relates to the processing of titanium bearing ores and more specifically to an improved process for low cost and high speed extraction, production and refining of titanium and titanium alloys.

BACKGROUND OF THE PRIOR ART

The present invention is an improvement over my earlier prior patent. U.S. Pat. No. 5,503,655 of Apr. 2, 1995, the disclosure of which is incorporated herein by reference. In this earlier patent, there is described a process in which a liquid slag containing titanium dioxide is reduced to a mixture of titanium dioxide and iron, the latter separated out to produce about 95% pure titanium dioxide, the balance being impurities. In subsequent processing, the partially pure titanium dioxide is melted and processed to remove any residual iron and other impurities to form titanium dioxide powder. If titanium metal or an alloy of titanium is to be formed, the titanium oxide powder is heated in a vacuum to remove the oxygen, forming high purity titanium metal which can then be alloyed.

Numerous other disclosures for processing and making titanium alloys are present in the art. Descriptions of some of these are found in the below listed patents:

| | |
|---|---|
| U.S. Pat. No. 4793854 | U.S. Pat. No. 3237254 |
| U.S. Pat. No. 3549353 | U.S. Pat. No. 3494804 |
| U.S. Pat. No. 4828608 | U.S. Pat. No. 4027722 |
| U.S. Pat. No. 3546348 | U.S. Pat. No. 2997760 |
| U.S. Pat. No. 3210454 | U.S. Pat. No. 3343828 |
| U.S. Pat. No. 4035574 | U.S. Pat. No. 4838340 |
| U.S. Pat. No. 3467167 | U.S. Pat. No. 2727937 |
| U.S. Pat. No. 3342250 | U.S. Pat. No. 4488902 |
| U.S. Pat. No. 3764297 | British Pat. No. 809444 |
| U.S. Pat. No. 3607222 | Canadian Pat. No. 549299 |

It is known that titanium, especially some of its alloys, e.g., titanium-aluminum-vanadium alloys such as $Ti_6Al_4V$ are important because they are ideally suited for a wide variety of applications in the aerospace, aircraft, military, and automotive fields. Titanium and its alloys, including that mentioned, combine the attractive properties of high strength and light weight with resistance to corrosion and stability under high temperatures. For example, titanium is very strong but only about 60% as dense as iron and parts made of titanium will weigh only 60% as much as the same part made of steel. While titanium is relatively easy to fabricate, there are numerous impediments to its widespread use. Refining titanium is energy intensive and involves significant costs in handling due to the need for toxic chemicals for its refining. Furthermore, in refining titanium, there is a high cost involved in disposing of the toxic byproducts produced in the refinery process. Finally there are the geopolitical aspects of having to obtain most of the semi-processed titanium sponge from former communist and communist countries as well as from the Republic of South Africa.

It is also known to process rutile, the latter basically a titanium oxide ore, by chlorinating the titanium dioxide ore in the presence of chlorine gas and carbon resulting in the formation of titanium tetrachloride and carbon dioxide. The titanium chloride is then processed by distillation in the presence of magnesium to produce titanium metal and magnesium chloride. The difficulty with this process is that magnesium metal is a very expensive reducing agent typically made by precipitating the magnesium as a hydroxide from sea water, the hydroxide being converted to the chloride by hydrochloric acid. The water is then evaporated and the magnesium chloride melted and electrolyzed with magnesium metal produced at the cathode and chlorine produced at the anode. It is apparent that such processing may involve potentially environmentally hazardous materials and byproducts.

Thus, it is a primary object of this invention to provide an improved and cost effective process for the production of high purity titanium and its alloys from a starting ore containing titanium and preferably in an oxide form.

Another object of the present invention is the conversion of a titanium bearing ore such as rutile or illmentite to an essentially pure titanium tetrachloride followed by reduction to titanium which is then followed by refining of the titanium to a pure state and optionally alloying the same.

Another object of this invention is the provision of an improved process for the production of a high purity titanium-aluminum-vanadium alloy such as $Ti_6AL_4V$.

Another object of this invention is to process molten titanium under conditions which prevent contact with environmental air which is of changing composition and processing the molten metal under at least two vacuum phases to outgas the metal and optionally to produce a titanium-aluminum-vanadium alloy.

These objects and features of the present invention will become more apparent form the following detailed description which provides detailed information regarding both the process and apparatus and which is for purposes of illustration and should not be construed as a limitation on the present invention.

BRIEF DESCRIPTION OF THE INVENTION

The above and other objects are achieved by a process for refining titanium containing ore and more particularly by a sequence which involves converting the titanium ore to a titanium tetrachloride, the latter reduced to titanium in a plasma reactor in the presence of molten sodium and finally processed to a relatively high purity while molten and under relatively high vacuum conditions followed optionally by alloying with other metals such as aluminum and vanadium In the portion of the process which produces titanium tetrachloride, many of the impurities such as iron chloride and vanadium are removed and the resulting product is of markedly reduced impurities, e.g., less than four parts per billion impurities.

The reduction of titanium tetrachloride is carried out in the presence of molten sodium and at atmospheric pressure in a plasma reactor. Thereafter, the molten titanium is processed under conditions of high vacuum and elevated temperatures, an operation which is carried out in stages with the vacuum of the second stage being higher than the vacuum of the first stage. It is in the second stage that alloying optionally may take place.

DESCRIPTION OF THE DRAWINGS

FIG. 1 is a diagrammatic illustration of the general steps for production of titanium alloy from titanium ore in accordance with the present invention;

FIG. 3 is an illustration of the plasma reactor for titanium production in accordance with this invention;

DETAILED DESCRIPTION OF THE INVENTION

Figure 2:
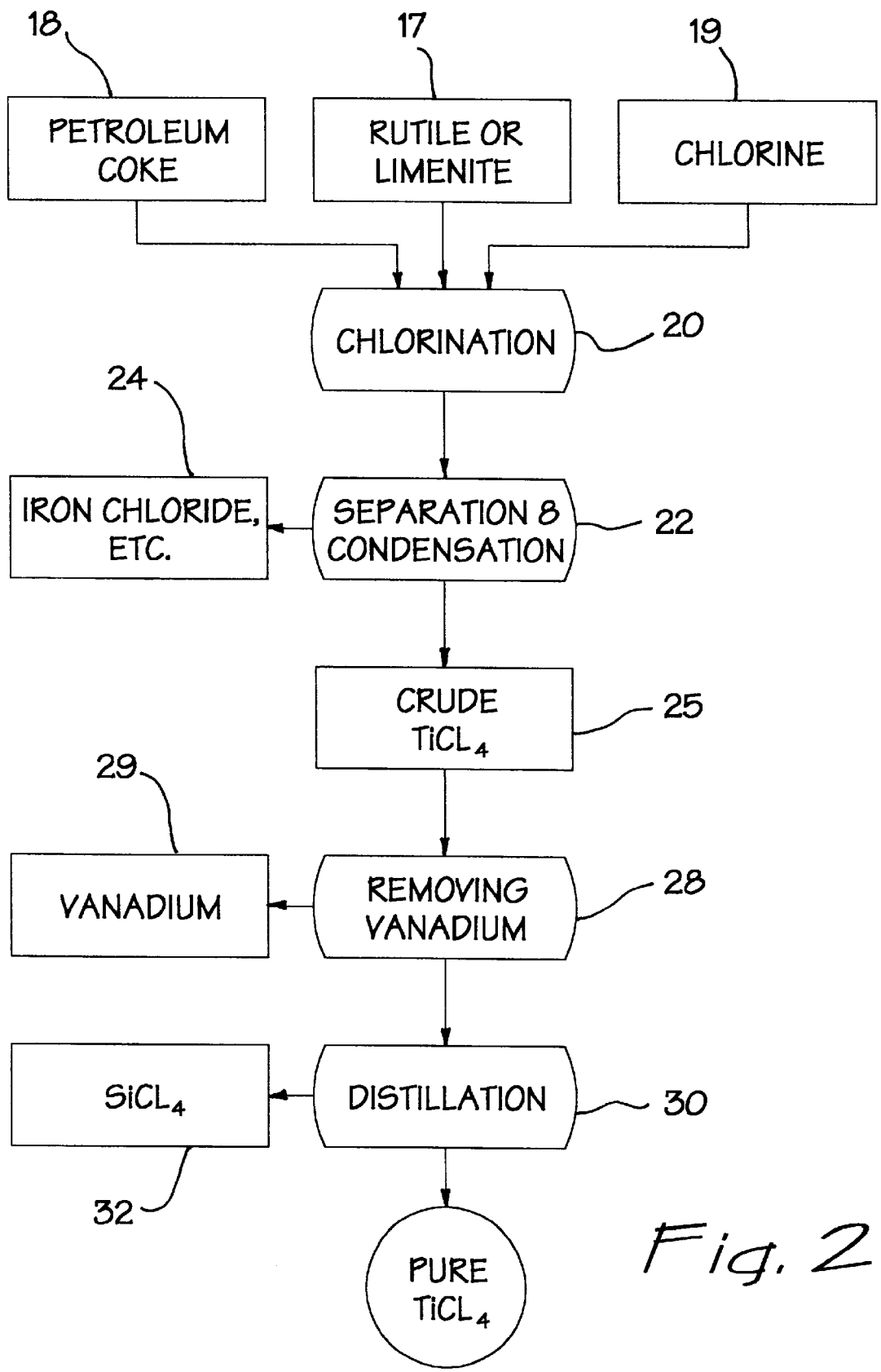
FIG. 2 is a process flowsheet for the production of titanium tetrachloride in accordance with this invention.

Referring to the drawings which illustrate a preferred embodiment of this invention, the general flow diagram of FIG. 1 shows the general sequence of steps. The first step 10 includes the formation of essentially pure $TiCl_4$ from a starting titanium bearing ore such as rutile or illmenite or mixtures of ores. Rutile is an ore containing titanium and oxygen ($TiO_3$) while illmenite is an ore containing iron, titanium and oxygen ($FeTiO_3$). For the purposes of this invention, any titanium containing ore or mixtures of ores preferably with oxygen, with or without other metals, may be used as the starting ore. The titanium ore is dressed in a conventional manner to produce an ore concentrate. In effect, the first general step 10 includes conversion of the starting ore to titanium tetrachloride preferably having less than 4 parts per billion of metallic impurities since the latter are difficult to remove in later processing. Generally, this step includes chlorination of the ore to form titanium tetrachloride.

The next general step 12 involves conversion of the essentially pure titanium tetrachloride to titanium metal by plasma arc treatment in basically a chemical reduction process resulting in the reduction of the $TiCl_4$ to titanium and sodium chloride. In this second general step, a plasma reactor is used in which sodium metal is melted and is injected into a reaction chamber with heated titanium tetrachloride resulting in the formation of titanium metal and sodium chloride.

The third general step 15 involves processing the titanium from the second step under a vacuum in which the titanium is heated and kept molten by electron guns and at progressively higher vacuum conditions resulting in a very pure titanium metal which can be cast into ingots or converted to the aluminum-vanadium alloy while the titanium metal is in liquid form. In this third general step, dissolved gases such as hydrogen and chlorine are removed by outgassing. Since outgassing generally cannot remove oxygen, nitrogen and carbon, the vacuum conditions or use of an inert gas environment tends to prevent these latter material from becoming contaminants.

FIG. 2 illustrates the details of the process involved in the first general step shown in FIG. 1 for the production of titanium tetrachloride from a suitable ore. As shown, a titanium and oxygen bearing ore 17 such as rutile or illmenite or mixtures, is admixed with petroleum coke 18 and chlorine gas 19 and processed in a chlorination step 20 at elevated temperature. After chlorination, the mixture contains titanium tetrachloride and iron chloride and other impurities which are separated out in a separation and condensation step 22, the impurities being separated at 24 resulting in the formation of a crude titanium tetrachloride as shown at 25.

The crude titanium tetrachloride is then processed at 28 to remove vanadium, as shown at 29, followed by distillation at 30, again at an elevated temperature, to remove silicon chloride as shown at 32. After removal of vanadium, the concentration of impurities is preferably below about 4 parts per billion. The result is essentially pure titanium tetrachloride ($TiCl_4$).

Thus, the first and second general steps involve ore dressing to produce an ore concentrate. The second general step involves reduction of the ore/concentrate to crude metal. This second step involves two separate sub-steps.

(a) Conversion of the concentrate to pure $TiO_4$. This is done by the chlorination process represented by the reaction:

$$TiO_2(s)+2Cl_2(g)+2C(s)\rightarrow TiCl_4(g)+2CO(g)$$

The chlorination process is carried out in a chlorinator. With Ilmenite ores, iron chloride is also formed and has to be removed as a separate step. The crude tickle is further purified to remove vanadium and silicon impurities. The final product is pure $TiCl_4$. All the metallic impurities have to be removed in this step since they cannot be removed subsequently.

The next step is the plasma arc reduction of titanium tetrachloride in the presence of molten metallic sodium to produce titanium and sodium chloride according to the equation:

$$TiCl_4+4Na\rightarrow Ti+4NaCl$$

The plasma reduction may be carried out in an apparatus 40 illustrated in FIG. 3 and referred to as a plasma reactor. The reactor include basically two zones, the upper zone 41 being at atmospheric pressure and the lower zone 43 being the input side of the reduction and refining apparatus (FIG. 5) at a controlled pressure of about 760 Torr with later stages under a vacuum, the two zones being separated by a barrier 45.

The top portion 50 of the reactor 40 includes a metallic sodium injection port 51 through which metallic sodium is introduced into the reactor. The metallic sodium is heated to a liquid by a plurality of plasma arc heaters 52 arranged at a tilted down 60 degree angle and being disposed circumferentially at 120 degrees from each other, two being shown at 52, and located vertically below the sodium injection port. The sodium is introduced at the focal point of the plasma arc heaters, as illustrated diagrammatically. Located vertically below the plasma heaters 52 is a titanium tetrachloride injection port 55 such that the heated and molten metallic sodium comes into intimate contact with the injected titanium tetrachloride and is intermixed therewith for reaction. Disposed vertically below the titanium injection port 55 is a dual reactor section 57 and 58 for reaction between the molten sodium and the heated titanium tetrachloride. Vertically below the reactor sections is a separator section 60 through which the sodium chloride is withdrawn through an exhaust system (not shown), the formed titanium metal in the form of molten titanium droplets passing from the separator which is at atmospheric pressure through the pressure barrier 45 to the input section of the further processing station to be described.

Figure 4:
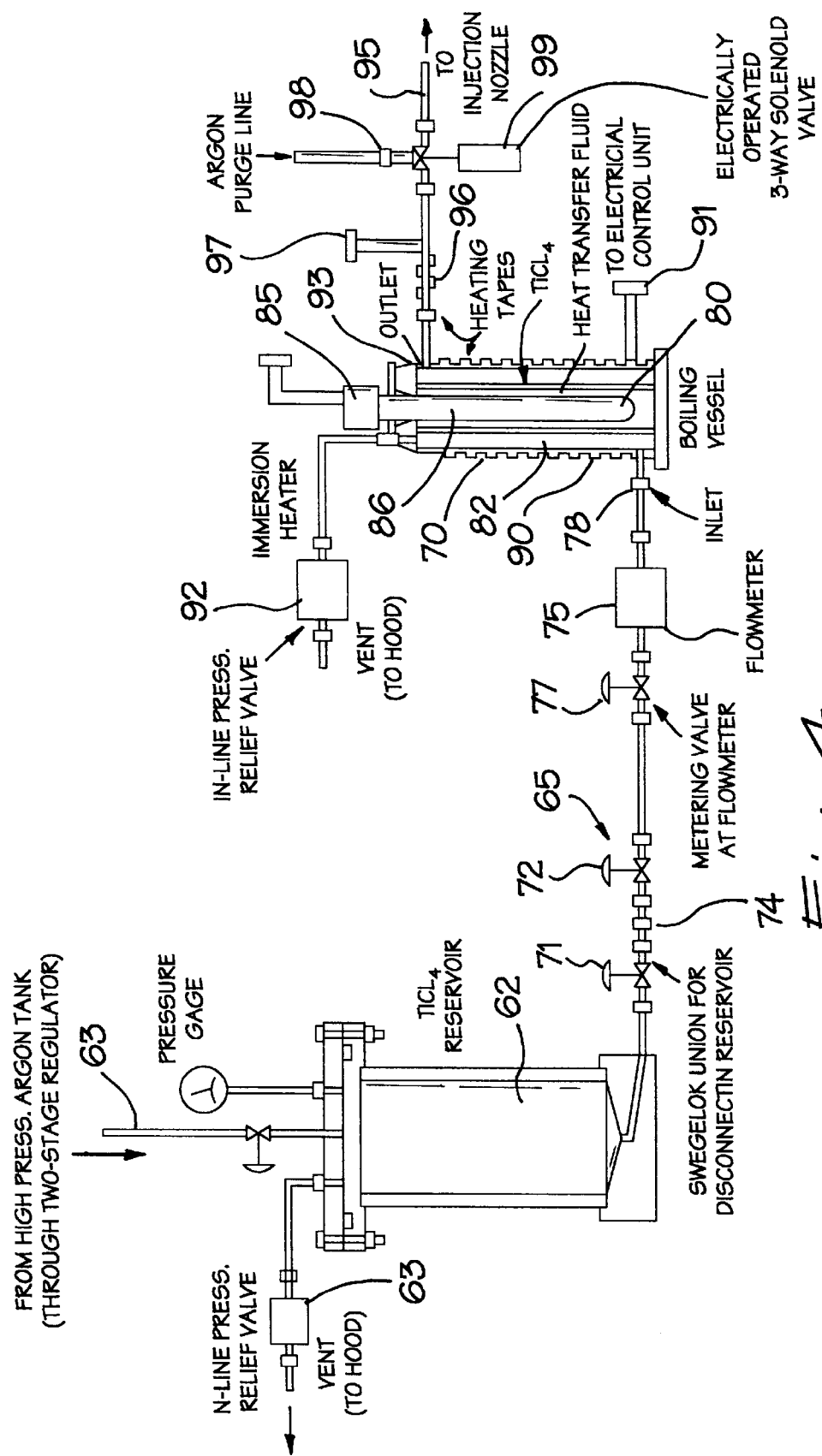
FIG. 4 is an illustration of the titanium tetrachloride supply system used with the plasma reactor of FIG. 3 in accordance with this invention.

A titanium tetrachloride supply system 60 for titanium tetrachloride injection into the plasma reactor 40 is illustrated diagrammatically in FIG. 4. The supply system includes a sealed titanium tetrachloride reservoir tank 62 which receives relative pure titanium tetrachloride for the process output of FIG. 2. The tank 62 includes an inert gas supply system 63 for argon gas, for example, supplied from a pressurized gas source such as an argon gas tank (not shown) through a two stage pressure regulator. The tank 62 also includes an in-line pressure relief valve 63 which may vent to a hood and a pressure gage 64 to monitor the internal pressure of the tank. The tank also includes an outlet system 65 whose output is connected to a titanium tetrachloride boiler vessel 70.

The outlet system includes a series of manually operated valves 71 and 72 and swinglock unions 74 for disconnecting the reservoir tank 62 from the remainder of the system. Down stream of the valves 71–72 is a flowmeter 75 controlled by a manually operated valve 77, the outlet 78 of the flowmeter being connected as the inlet to the boiler vessel 70 at the bottom region of the boiler vessel. The boiler vessel itself includes an inner heater section 80 and an outer titanium tetrachloride heater chamber 82, the latter surrounding the heater section 80 and being sealed relative thereto. The titanium tetrachloride is fed into the heater chamber 82 and is under a blanket of argon or other inert gas.

The heater section 80 includes an immersion heater assembly 85 which includes an immersion heater device 86 which extends into the heater section 80 and which is supported at the top of the tank 70 by means well known in the art. The immersion heater may be any one of the immersion heaters well known in the art. As shown, the immersion heater is spaced from the wall forming the heater chamber 82 and is preferably filled with a heat transfer fluid for effective transmission of heat from the heater device 86 to the wall of the chamber 82.

Surrounding the outer wall of the tank 70 is a heater tape unit 90 connected to a source of electrical power through junction 91. Mounted at the top of the tank 70 and communicating with the heater chamber 82 is an in-line pressure relief valve 92 which vents to a hood. The tank 70 and the heater chamber 82 includes an outlet 93, the exit side 95 of the outlet forming the inlet injection nozzle for the injector 55 of the plasma reactor 40 of FIG. 3. The outlet system 93 from tank 70 includes heating tapes 96 supplied with power from a junction 97. Downstream of the tapes 96 is an argon purge valve 98 controlled by a three way electrically operated solenoid valve 99.

Figure 5:
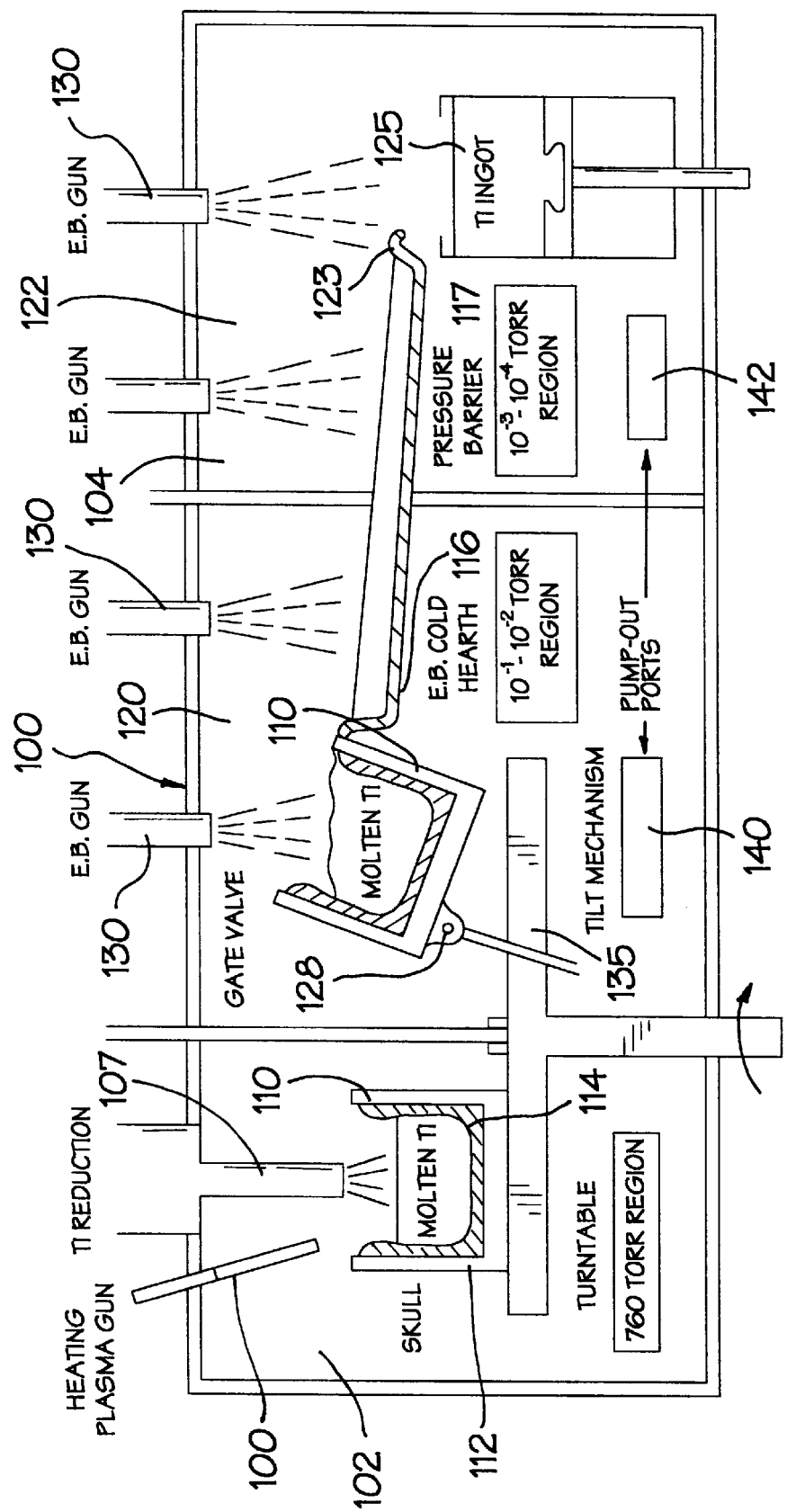
FIG. 5 is an illustration of the apparatus for titanium reduction and purification in accordance with this invention.

The apparatus 100 for reduction and refining and/or alloying of the titanium metal output from the device of FIG. 2 is shown in FIG. 5. The apparatus 100 includes multiple chambers separated into two general pressure zones 102 and 104 by a gate valve 105 (as shown) or a separately pumped buffer zone (not shown). The zone 102 on the left contains a titanium reduction plasma gun 107, such as a hydrogen argon plasma gun and additional plasma guns 108 for heating the titanium carrying skull 110 and the molten titanium as it is produced. Zone 102 is at atmospheric pressure, e.g. 760 Torr, and receives molten titanium, in the form of titanium droplets, from the output of the reactor. The liquid titanium droplets entering section 102 at 107 are heated by the plasma gun 108 and the gun output impinges on molten titanium pool in a ceramic vessel or boat 112 provided with a water cooled copper insert (not shown) on which titanium has previously solidified on the vessel walls to form a skull or solidified titanium coating 114 of basically pure titanium metal. The titanium skull 114 prevents the molten titanium from contacting the bare walls of the ceramic vessel 112 which would result in reaction between titanium and the ceramic with resultant contamination of the titanium. Thus, incoming molten titanium contacts the solid titanium coating 114 of the vessel 112, the coating being maintained solid by the water cooled insert in the ceramic boat.

The zone 104 on the right of zone 102 is at high vacuum and contains a water cooled copper hearth 116 on which a titanium skull 117 has been previously formed. The hearth may be cooled by interior water cooling pipes, not shown. There are several sections in this zone: the first zone 120 at $10^{-1}$ to $10^{-2}$ Torr; the next and successive zone 122 is at a lower vacuum than the first zone, e.g., $10^{-3}$ to $10^{-4}$ Torr; the final zone including the cold hearth 116 having a lip 123 over which the molten metal flows to be cast into a retractable ingot mold 125. Electron beam guns 130 keep the titanium molten in each of these sections. Alloying elements can be introduced into the second section or zone 122 operating at $10^{-3}$ to $10^{-4}$ Torr so that an alloy, as previously described, may be formed. To form the alloy mentioned, powdered aluminum in an amount of 6% by weight and powdered vanadium in an amount of 4% by weight is introduced into the vacuum chamber. The flow rate through the sections has to be a constant if the proper amount of alloys are to be introduced to meet alloy specifications.

There may be between 1 to 3 ceramic vessels 110, 110*a* with titanium skulls, formed as described. The ceramic vessels are positioned and supported on a table 135 which can be rotated 180 degrees so that the vessel full of molten titanium can be swung from section 102 into the left part of the chamber 104. There is also a tilt mechanism 138 in the left position of section 104 which permits the molten titanium to be gradually poured over the sloping hearth 116 and flow from left to right and be cast into an ingot in mold 125. As shown, each of sections 102 and 104 includes pump out ports 140 and 142 for vacuum control.

With this design, the reduced titanium metal collection rate in the section 102 is independent of the flow rate on the hearth 116 in section 104. Since two vastly different technologies are operating in the sections 102 and 104, it is almost impossible to match the reduction rate in section 102 to the flow rate on the hearth 116 in the left section 104.

In operation, the first step is to turn on the plasma guns 108 and melt the surface of the skull 110 in section 102. In the next step, the plasma reduction gun 107 is turned on and the newly reduced titanium is sprayed onto the molten surface of the skull 110 to fill it up.

Once a skull is filled, the succeeding step is to open the gate valve between sections 102 and 104 and swing the vessel full of molten titanium to section 104 while an empty skull swings to position in section 102. Alternate arrangements as may be apparent to those skilled in the art may also be used for this operation. The next step is to close the gate valve isolating the two chambers 102 and 104.

Following the closure of the gate valve, the electron guns 130 in section 104 are turned on to melt the surface of the skull in the sloping hearth 116. The vessel 110*a* full of molten titanium is tilted and poured at a steady rate onto the hearth 116 so that the gases, chlorine and hydrogen, are removed and the titanium is cast into the ingot mold. The rate at which the metal is poured over hearth depends on the quantity of gases present in the titanium from the reduction step. The larger this quantity, the slower the rate so as to give enough time for degassing to occur.

While the preceding step is occurring in the section 104, the first step is operational in section 102.

The virtue of this arrangement is that the processing rates in the left and right zones can be controlled independently of each other to achieve an overall steady production rate.

The gases dissolved in the reduced titanium, i.e., chlorine, oxygen, nitrogen, carbon, and hydrogen are removed. Chlorine and hydrogen can be readily removed by exposing the molten titanium surface to high vacuum, while keeping the titanium sufficiently hot so that it can be cast as an ingot after the vacuum degassing operation. As noted, oxygen, nitrogen and carbon cannot be removed by vacuum degassing and hence must be kept out of the titanium by carrying out all processing in an environment where the partial pressures of these gases is very low, i.e., in a vacuum or inert atmosphere, taking great care that there are no leaks to the atmosphere in any of the processing vessels.

Thus, one of the advantages of this invention is that the plasma reactor and the reduction refining station are basically one integrated apparatus. In this way the reduced titanium tetrachloride in the form of molten titanium droplets exits the reactor directly to the vacuum processing stage. The transition zone from the reactor is between the reactor and the reducing refining zones and thus the molten drops of titanium are not exposed fresh ambient environment or at least the exposure to fresh ambient environment is minimized.

In effect, from the time of the formation of the molten titanium, the metal is under controlled conditions of ambient or vacuum conditions or inert gas conditions so that the partial pressures of the gases which are difficult to outgas are kept at a minimum. This is achieved by a single integrated apparatus so that the molten titanium metal can be handled and transferred within a controlled environment provided by a single contained apparatus which is effective not only to maintain environmental conditions surrounding the molten titanium under control, but also to exclude the gases which are difficult to outgas.

An additional and valuable option is the ability to alloy the titanium while it is still molten and make a much more valuable titanium alloy, e.g., $Ti_6Al_4V$. This may be accomplished in the high vacuum side of the device.

Another advantage of this invention is the formation of basically pure titanium tetrachloride which is then processed to provide basically pure titanium metal which can be alloyed, as desired. Moreover, while the starting material is a titanium containing ore, this is preferred as opposed to the use of titanium dioxide powders since the latter are relatively expensive and may contain impurities which may be difficult to remove and which may adversely impact the final purity of the finial titanium product. Another advantage of the present invention is that the final refining and alloying operation is carried out in a single device, the low pressure units which are under controlled atmosphere conditions, i.e., vacuum or inert gas environment. These atmospheric conditions are essentially benign in the sense that the atmosphere with which the molten titanium is in contact does not include contaminating gas or gases. In this way the purity of the final product is not compromised by exposure to ambient air and the contaminants in air.

It will be apparent to those skilled in the art from the above detailed description and drawings of the preferred form of this invention that various changes and modifications, as will be apparent to those skilled in the art, may be made without departing from the spirit and scope of this invention, except as set forth in the appended claims.

What is claimed is:

1. A process for the production of titanium metal and alloys thereof comprising:

processing titanium containing ore to form essentially pure titanium tetrachloride, said processing step including the steps of:
   a. chlorinating the titanium bearing ore to form a titanium tetrachloride mixture containing as impurities at least iron chloride, vanadium and silicon chloride,
   b. condensing and separating the mixture to remove the iron chloride to form a crude titanium tetrachloride mixture,
   c. removing the vanadium present in the mixture,
   d. distilling the resultant titanium tetrachloride to remove the silicon chloride to form a titanium tetrachloride material having less than about four parts per billion of impurities, reacting the titanium tetrachloride material with molten sodium while heating with plasma arc heaters to reduce the titanium tetrachloride material to molten titanium metal, processing the thus produced molten titanium metal under controlled atmospheric conditions to effect outgassing of the molten titanium metal, said processing of the molten titanium metal including a first and second processing phase at elevated temperature and separate levels of vacuum, said second phase being conducted at a vacuum level below that of the first phase and optionally including the step of alloying the molten titanium metal to form a titanium-vanadium alloy, and recovering essentially the essentially pure titanium metal or alloy.

2. A process as set forth in claim 1 wherein the step of reacting the titanium tetrachloride material includes the step of introducing the titanium tetrachloride material into the focal point of the plasma arc heaters for reaction with the molten sodium metal.

3. A process as set forth in claim 1 wherein the conversion of the titanium tetrachloride material to titanium metal is conducted at ambient atmospheric pressure, and said titanium metal being transferred from an ambient atmospheric pressure environment to a reduced pressure environment for processing of the molten titanium metal for outgassing of hydrogen and chlorine gas.

4. A process as set forth in claim 1 wherein said titanium ore is selected from the group consisting of rutile and ilmenite and mixtures thereof.

5. A process as set forth in claim 1 including the step of transferring the formed titanium metal from the reacting step to the processing step of two phases is conducted under controlled environmental conditions to reduce contamination the gases which are difficult to outgas.

6. A process as set forth in claim 1 wherein aluminum and vanadium are introduced into the molten titanium during said second phase processing at a high vacuum level to produce a titanium-aluminum-vanadium alloy.

7. A process as set forth in claim 6 wherein said aluminum is introduced in an amount of 6% by weight and the vanadium is introduced in an amount of 4% by weight.

8. A process as set forth in claim 1 wherein said processing of the molten titanium metal includes receiving the said molten titanium metal in at least one skull in the first processing phase and causing said molten titanium metal in the first processing phase to be transferred to the second processing phase, and maintaining said titanium in a molten state by heating the same with at least one electron beam gun.

9. A process as set forth in claim 1 wherein the molten titanium from the reacting step is heated by a hydrogen argon plasma gun before the processing step.

* * * * *